Figure 1:
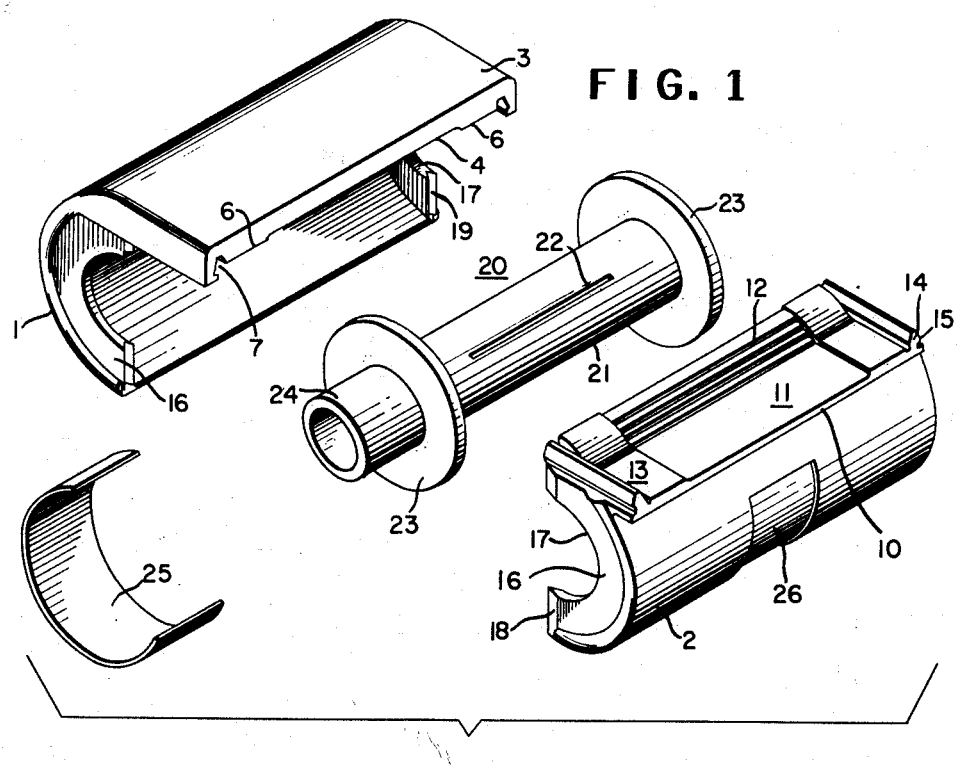

April 7, 1964   L. A. RINGLE ETAL   3,128,058
PLASTIC CASING FOR PHOTOGRAPHIC FILM SPOOLS
HAVING LIGHT-ABSORBING BAFFLES
Filed Dec. 27, 1961

INVENTORS
LOUIS A. RINGLE
ROBERT N. MARONA

BY Lynn Barratt Morris

ATTORNEY ent Office 3,128,058
Patented Apr. 7, 1964

3,128,058
PLASTIC CASING FOR PHOTOGRAPHIC FILM SPOOLS HAVING LIGHT-ABSORBING BAFFLES
Louis A. Ringle, Wilmington, Del., and Robert N. Marona, Forest Hills, N.Y., assignors to E. I. du Pont de Nemours and Company, Wilmington, Del., a corporation of Delaware
Filed Dec. 27, 1961, Ser. No. 162,452
6 Claims. (Cl. 242—71.1)

This invention relates to an improved casing for a spool of photographic film and more particularly to a plastic casing and to an assembled film cartridge embodying said casing.

Many different types of metal and plastic casings for spools of photographic film are known. These casings, in general, have three or more separate parts and they require time for assembly to form a light-proof cartridge. In order to prevent the photographic film in the cartridge from being exposed, it is necessary to line the lips of the casing with cut-velvet, pile-velvet, felt, velours, polyurethane sponge material or other sponge materials, or materials made by a flocking process. The provision of such a lining is tedious and adds considerably to the expense of making the casings. In addition, there is a tendency for the lining material to scratch the sensitive surface of the photographic film. This is particularly true when sharp, abrasive dust particles become lodged in or adhere to the linings.

An object of the present invention is to provide an improved casing for a spool of photographic film. Another object of the present invention is to provide such a casing which is free from lining materials for the lips of the casing and yet provides an effective light trap. A further object is to provide such a casing which is simple in structure and can be readily molded. Still further objects will be apparent from the following detailed description of the invention.

The novel casings for spools of photographic film of this invention comprise two semicylindrical body halves of lightproof plastic material having their end walls provided with semicircular openings adapted to receive the hub of a film spool and having interfitting tongues and grooves at the radial edges of the side walls and at the longitudinal juncture between said body halves, one of the halves having a tangentially disposed lip and the other a coacting reversely disposed lip, the lips providing therebetween a narrow slot for the passage of a film, the surfaces of said lips having interfitting tongues and grooves, said lips being characterized by having an inner curved portion for guiding a photographic film in a curved path, the curved surfaces of the lips containing steps forming light-absorbing baffles. In the preferred construction the upper surface of the inner lower lip is provided with a plurality of such steps and the other lip has a single coacting step. These steps extend across the major width of the slot.

The semicylindrical body halves can be two separate members which are held in place by a suitable clip or retaining member, or the halves may be characterized by being joined by an integral, thin, flexible hinge extending the full width of the casing.

The cartridges of the invention comprise one of the aforesaid casings and an interfitting spool for photographic film having flanges adjacent the inner walls of the casing and a protruding hub extending through the cylindrical opening of the ends of the casing when in assembled form.

The novel casings and the assembled cartridges of this invention will now be more fully described with reference to the accompanying drawing, which forms a part of this application. In this drawing, the same reference numerals refer to the same parts throughout the several views.

Figure 2:
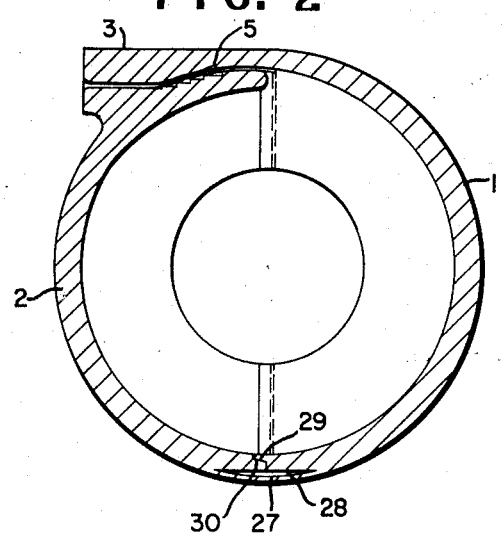
Figure 3:
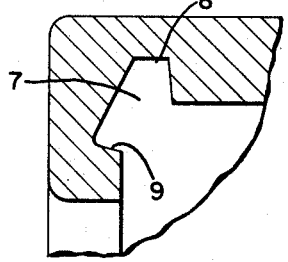

With reference to the drawing:
FIG. 1 is an exploded view of the various parts of one type of film cartridge in disassembled relationship with an interfitting spool and a retaining clip.
FIG. 2 is a cross-sectional view of a related cartridge in closed position, without the film spool and having an integral flexible hinge, and
FIG. 3 is a sectional view of one corner of the upper lip showing the interlocking groove construction.

The casing of the invention illustrated in FIG. 1 of the drawing is of the general type shown in assignee's Nebel U.S. Patent 2,476,996, patented July 26, 1949. This casing consists of two interfitting, semicylindrical body members 1 and 2, namely upper member 1 and lower member 2. The upper member has a protruding tangential lip 3 which has a shallow, recessed portion 4 which is approximately straight or horizontal for a short distance and then curved inwardly to meet the curved inner surface of the body half. The inner surface of this curved portion is recessed to form a light-absorbing step 5 (FIG. 2). On each side of the inner recessed portion is another recessed portion 6 of less depth that is adapted to receive and press against the perforated area of edge-perforated photographic film. Adjacent each latter recessed portion is a tangential groove 7 having an upper tongue-receiving groove 8 and an interlocking lateral groove 9. The lower body half has a coacting lip portion 10 which is similarly provided with a central recessed portion 11 which extends parallel to the recessed portion of the upper lip for a short distance and then extends upwardly in a generally curved path. The curved portion is provided with a plurality of lateral light-absorbing steps 12. The risers of steps 12 are in planes that are substantially perpendicular to the outer straight portion of the lips and the treads are in planes that are substantially parallel to said outer straight portion. On each side of the recessed central portion is a slightly raised portion 13, the outer part of which curves upwardly to coact with the curved inner surface of the upper lip and is adapted to receive and press against the perforated area of edge-perforated photographic film. Adjacent each such latter portions of the lip is a protruding tangential tongue 14 which interfits with the tangential groove in the upper lip. This tongue has a lateral projection 15 which interfits with the interlocking portion 9 of the upper lip.

The end walls 16 of the semicylindrical body members have semicylindrical openings 17 which are adapted to receive the protruding hub of a film spool. The end walls on the lower body member have a tongue or knife edge 18 which interfits with a groove 19 in the radial edges of the end walls of the upper body member.

Spool 20, having a central hub 21, a film-receiving slot 22, end flanges 23 and protruding hub 24, interfits in the casing to form a light-proof cartridge. In the casing of FIG. 1, the two body halves are held in place by means of a spring clip 25 which fits into outer recess 26 of the two body members of the casing. Alternatively, the two body halves may be held in place by a piece of pressure-sensitive tape in place of the clip.

The film casing of FIG. 2 is similar to that of FIG. 1 except that the two body halves are joined together on a line diametrically opposite to the line of tangency of the lip member, with an integral, thin, flexible hinge 27. This hinge extends lengthwise the entire width of the body halves. These body halves preferably have a void or recessed portion 28 under the hinge. In addition, the upper body member preferably has an offset portion 29 along its longitudinal edge and the lower body hinge has an interfitting fillet 30 at its longitudinal edge so that when the halves are in assembled position the offset portion and fillet overlap, thus further insuring the lightproof character of the film casing and assembled cartridge. The longitudinal edge may be bevelled and overlapped.

The integral hinge construction and interlocking tongue and groove features of the cartridge of FIGS. 2 and 3 are disclosed in and constitute part of the invention of assignee's Ringle application Ser. No. 86,092, filed March 2, 1961, and entitled "Film Casing and Cartridge."

In assembling the body members and spool to form a film cartridge, a spool of film is inserted into the upper or lower half body member and the two body halves are fitted together and squeezed at the lip portions so that the tongues and grooves interfit and interlock. The retaining clip or pressure-sensitive tape is then placed into the recesses in the outer surfaces of the body members.

The film cartridge shown in FIG. 2 can be assembled in like manner except that the two body halves are swung into position and squeezed near the lip members so that the tongues and grooves interfit.

The body halves and casing and the spool can be made of any suitable plastic material by conventional molding processes and by using conventional apparatus. Injection molding processes constitute practical processes for making the casings and spools. The plastic materials for the casings should have some degree of flexibility so that the hinge can be flexed during assembly and disassembly without rupture and the interlocking tongue and groove element enables the lips to be snapped into place. Among the useful plastic materials which can be used are thermoplastic cellulose derivatives, e.g., cellulose acetate, cellulose propionate, cellulose acetate butyrate, cellulose acid propionate, methyl cellulose and ethyl cellulose; superpolymers, e.g., nylon (polyamides), polyethylene, polypropylene, polystyrene, polyacrylic acid esters; alkyd resins, cresol-formaldehyde resins, etc.

The thermoplastic compositions used to make the casings and spools can be modified by incorporating therewith various plasticizers, e.g., camphor, aryl phosphates, alkyl phthalates, glycerol, castor oil, etc. The compositions, moreover, may contain pigments, e.g., lithopone, graphite, carbon black, titanium oxide, phthalocyanine dyes, etc. They may also contain fillers, e.g., wood, asbestos fibers, diactomaceous earth, etc.

In the case of metal spools, die casting as well as powdered metal molding operations may be resorted to. Thus, the spools can be made of brass, aluminum or steel.

Spools and casings should be photographically inert so that photographic film elements spooled therein will not be deleteriously affected. They may be coated with an inert paint, varnish or lacquer to insure against the presence of deleterious ingredients.

Various types of spools can be used in the film casings of this invention. Thus, the spools can have various types of slots or other means so that the film element can be fastened or attached to the hub of the spool. A practical hub and slot construction with a retaining hook portion is disclosed in Schmidt U.S. Patent 2,477,010, July 26, 1949.

The casing and film cartridge of this invention is expressly designed for photographic film having perforations along one or both edges, which perforations interfit the sprockets in cameras and projectors. The casings, however, can be used for non-perforated photographic film, and in such case it is not necessary to have portions of the slot near the edges of lesser width than in the center. In such case, the light-absorbing steps can extend throughout the entire width of the slot.

The film casing of the invention with the novel light-absorbing steps have the advantage that they can be readily made and assembled. The light-absorbing lip construction is simple but effective in use.

The novel lip construction provides a simple light trap which eliminates the need for velvet or related inserts in order to prevent end fog. Another advantage of the invention is that the film casings and cartridges can be made and assembled in a more economical manner than those containing velvet inserts to prevent end fog.

What is claimed is:

1. A casing for a spool of photographic film comprising two semicylindrical body halves of lightproof plastic material having their end walls provided with semicircular openings adapted to receive the hub of a film spool and having interfitting tongues and grooves, one of said halves having a tangentially disposed upper lip and the other a coacting lip, the lips providing therebetween a narrow slot for the passage of a film, the lips having interfitting tongues and grooves, each of said lips being characterized by having an outer straight portion and an inner curved portion providing a curved extension of the slot for guiding a photographic film from the spool to and through the slot and serving to prevent light rays from passing into the casing by having in said curved portion steps that constitute light-absorbing baffles, the risers of said steps being in planes that are substantially perpendicular to the outer straight portion of the lips and the treads being in planes that are substantially parallel to said outer straight portion.

2. A casing according to claim 1 wherein the coacting lip contains a plurality of such steps and the upper lip contains a single step.

3. A casing according to claim 1 wherein the steps are in a central recessed portion of the lips, and adjacent said recessed portion is a narrow portion recessed to a lesser degree than the main portion.

4. A casing according to claim 1 wherein the two casings are joined by an integral hinge and the edges of the casing overlap at the juncture beneath the hinge.

5. A film cartridge comprising a spool of photographic film and a casing comprising two semicylindrical body halves of lightproof plastic material having their end walls provided with semicircular openings receiving the hub of the film spool and having interfitting tongues and grooves, one of said halves having a tangentially disposed upper lip and the other a coacting lip, the lips providing therebetween a narrow slot for the passage of the film, the lips having interfitting tongues and grooves, each of said lips being characterized by having an outer straight portion and an inner curved portion providing a curved extension of the slot for guiding a photographic film from the spool to and through the slot and serving to prevent light rays from passing into the casing by having in said curved portion steps that constitute light-absorbing baffles, the risers of said steps being in planes that are substantially perpendicular to the outer straight portion of the lips and the treads being in planes that are substantially parallel to said outer straight portion.

6. In a lightproof casing for a spool of photographic film having lips providing an elongated slot for the ingress and egress of photographic film, each of said lips having an outer straight portion and an inner curved portion providing a curved inner extension of the slot, said curved portion serving to prevent light rays from passing into the casing by having therein steps that constitute light-absorbing baffles, the risers of said steps being in planes that are substantially perpendicular to the outer straight portion and the treads being in planes that are substantially parallel to said outer straight portion.

References Cited in the file of this patent

UNITED STATES PATENTS

| | | |
|---|---|---|
| 2,329,989 | Hilquist | Sept. 21, 1943 |
| 2,476,996 | Nebel | July 26, 1949 |
| 2,731,894 | Leitz et al. | Jan. 24, 1956 |
| 2,844,244 | Hanson | July 22, 1958 |
| 2,885,135 | Friday | May 5, 1959 |
| 2,983,462 | Berlings | May 9, 1961 |

FOREIGN PATENTS

| | | |
|---|---|---|
| 1,216,593 | France | Nov. 30, 1959 |
| 950,258 | Germany | Oct. 4, 1956 |